March 8, 1966  C. BRAMMING  3,239,090
CORRUGATED STOPPER FOR VACUUM BOTTLES OR THE LIKE
Filed June 30, 1961

INVENTOR.
Carl Bramming
BY
Ooms, McDougall & Hersh
Att'ys

United States Patent Office 3,239,090
Patented Mar. 8, 1966

3,239,090
CORRUGATED STOPPER FOR VACUUM
BOTTLES OR THE LIKE
Carl Bramming, Nashville, Tenn., assignor to Aladdin Industries, Incorporated, Nashville, Tenn., a corporation of Illinois
Filed June 30, 1961, Ser. No. 121,001
1 Claim. (Cl. 215—52)

This invention relates to closures for vacuum bottles or other similar receptacles.

One object of the present invention is to provide a new and improved closure which comprises a hollow stopper having a side wall which is formed with circumferential corrugations or convolutions so as to be extensible and retractable, and thus adaptable to a wide range of variations in the mouth diameters of the vacuum bottles.

Thus, it is an object of the present invention to provide a new and improved stopper which will make a tight seal with the mouth of a vacuum bottle, despite the fact that the diameter of the mouth may vary over a fairly wide range due to normal production tolerances in the manufacture of glass vacuum insulated fillers.

A further object is to provide a new and improved stopper of the foregoing character which is highly effective yet may be molded at extremely low cost from resinous plastic materials.

Further objects and advantages of the present invention will appear from the following description, taken with the accompanying drawings, in which.

Figure 1:
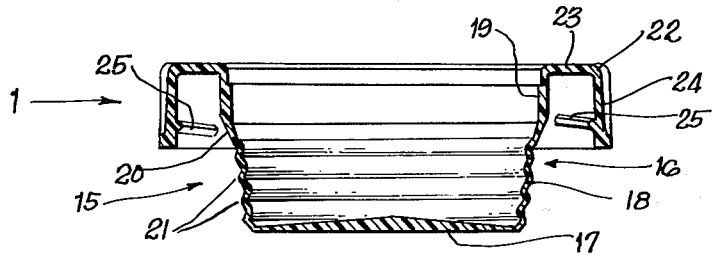
FIG. 1 is a central vertical section taken through a closure to be described as an illustrative embodiment of the present invention.

The drawings illustrate a closure 1 which may be employed to close a vacuum bottle 2 or some other similar receptacle. The illustrated vacuum bottle 2 is of the usual construction, having a vacuum insulated filler or inner receptacle 3, enclosed within an outer protective jacket 4. The filler 3 has inner and outer walls 5 and 6 with a vacuum insulated space 7 therebetween. The upper ends of the walls 5 and 6 are joined by a rounded rim or wall portion 8 which is generally semicircular in cross-section. A downwardly tapering mouth 9 is formed within the upper end of the inner wall 5.

In this case, the jacket 4 has an upwardly tapering annular collar portion 10 which has an inwardly projecting annular flange 12 at its upper end. An outwardly flaring upwardly projecting annular pouring lip 13 is formed on the flange 12. It will be seen that an annular gasket or sealing ring 14 is interposed between the flange 12 and the upper end of the filler 3 to prevent leakage of any fluid into the space between the filler and the jacket 4. The gasket 14 may be made of soft synthetic rubber or other similar material. It will be understood that the filler 3 is normally made of glass, while the jacket 4 may be made of a suitable plastic material, metal or the like.

The illustrated closure 1 comprises a stopper member 15 adapted to be inserted into the mouth 9 of the vacuum bottle. The stopper member 15 may be made of a soft flexible resilient resinous plastic material, such as polyethylene, polypropylene or the like. In some cases, the stopper might be made of synthetic rubber or similar materials.

The illustrated stopper member 15 is hollow and generally cup-shaped in form and is provided with a thin downwardly tapering annular side wall 16. A circular bottom wall 17 extends across and closes the lower end of the side wall 16.

It will be seen that the side wall 16 has a relatively thin-walled lower portion 18 and a relatively thick-walled upper portion 19. A downwardly facing, downwardly tapering shoulder 20 is formed on the outside of the side wall between the upper and lower portions 19 and 18. This shoulder 20 is adapted to seat against the rounded upper rim 8 of the vacuum bottle.

In accordance with the present invention, the lower side wall portion 18 is formed with a plurality of corrugations or convolutions 21 which extend circumferentially around the side wall. By virtue of the corrugations 21, the side wall portion 18 is rendered extensible and retractable in the manner of a bellows. The illustrated corrugations 21 are annular in form but they might be spiral or helical in form.

The extreme flexibility of the corrugated side wall portion 18 enables the stopper to adapt itself to a wide range of variation in the diameter of the mouth 9 of the vacuum bottle. In the manufacture of glass vacuum insulated fillers for vacuum bottles, it is extremely difficult to hold the fillers to close dimensional tolerances. In order to avoid an excessive number of rejects, it is necessary to accept and utilize fillers having a fairly wide range of tolerances as to the diameter of the mouth 9. The present stopper is extremely effective in adapting itself to variations in mouth diameter while maintaining a tight seal.

Figure 2:
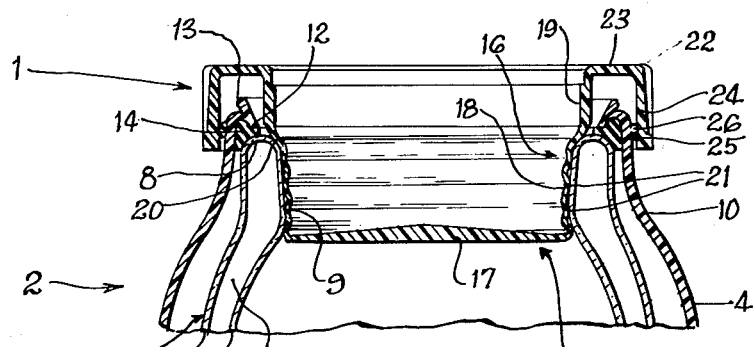
FIG. 2 is a view similar to FIG. 1, but showing the closure mounted in a vacuum bottle having a relatively small or undersize mouth.

Thus, FIG. 2 illustrates the action of the corrugated side wall portion 18 when the closure 1 is mounted in a vacuum bottle having a mouth 9 which is relatively small or undersize. It will be seen that the pressure between the stopper and the undersize mouth flattens out the corrugations 21. This causes the side wall portion 18 to elongate or extend itself to a considerable extent, in the manner of a bellows.

Figure 3:
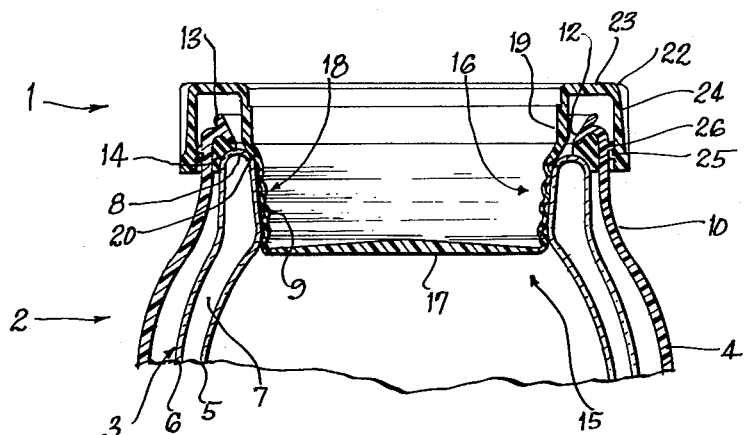
FIG. 3 is a view similar to FIG. 2 but showing the closure mounted in a vacuum bottle having a somewhat larger or oversize mouth.

On the other hand, FIG. 3 illustrates the closure 1 when mounted in a vacuum bottle having a larger, somewhat oversize mouth 9. In this case, the corrugations 21 are pressed inwardly to only a slight extent, so that there is only a slight elongation of the side wall portion 18. In both cases, the corrugations make a tight seal with the mouth 9 of the vacuum bottle.

The illustrated closure 1 is provided with an arrangement whereby the closure is securely mounted on the vacuum bottle, so that the stopper member will always be pushed firmly into the mouth 9. Thus, a mounting flange 22 is connected to the upper end of the upper side wall portion 19. As shown, the flange is generally inverted L-shaped in cross section. Thus, the flange 20 has an outwardly projecting horizontal portion 23 and a downwardly projecting generally cylindrical skirt 24. Screw threads 25 or other locking formations are formed on the inside of the skirt 24. In the illustrated construction, the internal screw threads 25 are adapted to engage external screw threads 26 which are formed on the outside of the collar portion 10 of the vacuum bottle.

Thus, the closure 1 is mounted on the vacuum bottle by inserting the stopper member 15 into the mouth 9 and rotating the closure so that the engaging threads 25 and 26 will pull the closure downwardly. This action pushes the stopper member 15 firmly into the mouth 9 so that a tight seal will be established between the corrugations 21 and the mouth. As the stopper member 15 is pushed into the mouth, the corrugations are flattened and the side wall portion 18 is elongated to the extent necessary to adapt the stopper to the particular diameter of the mouth. If the mouth is undersize, the corrugated side wall portion 18 is elongated to a relatively great extent, as shown in FIG. 2. If the mouth is slightly oversize, the elongation of the corrugated side wall portion 18 will be less pronounced, as shown in FIG. 3.

It will be understood that the closure 1 may be molded in one piece from economical plastic materials. Thus, the closure may be manufactured at extremely low cost.

Various other modifications, alternative constructions and equivalents may be employed without departing from the true spirit and scope of the invention, as exemplified in the foregoing description and defined in the following claim.

I claim:

A closure for a vacuum bottle or the like,
said closure comprising a hollow thin-walled stopper member having a downwardly tapering annular side wall and a circular bottom wall extending across and closing the lower end of said side wall,
said stopper member being made of a soft flexible resilient resinous plastic material,
said side wall having an upper portion with an annular mounting flange connected to the upper end thereof,
said side wall having a lower annular bellows portion,
said side wall having a downwardly tapering annular shoulder between said upper portion and said bellows portion,
said bellows portion having a wall thickness substantially less than the wall thickness of said upper portion,
said mounting flange being of an inverted L-shape in cross section and having an outwardly projecting portion and a downwardly projecting skirt with thread means on the inside thereof for securing the closure to a vacuum bottle or the like,
said lower annular bellows portion of said side wall having a substantially uniform wall thickness and being folded to form a plurality of flexible annular corrugations rendering said bellows portion extensible and retractable so that said bellows portion is capable of adapting itself to a wide range of mouth diameters while maintaining a tight seal,
said corrugations being formed on both the outside and the inside of said annular bellows portion of said side wall.

References Cited by the Examiner
UNITED STATES PATENTS

| | | | |
|---|---|---|---|
| 881,779 | 3/1908 | Dickens | 215—52 |
| 2,669,370 | 2/1954 | Royall | 215—47 |
| 2,815,879 | 12/1957 | Hermes | 215—13 |
| 2,934,231 | 4/1960 | Bramming | 215—13 |
| 2,954,890 | 10/1960 | DelValle | 215—48 |

FOREIGN PATENTS

| | | |
|---|---|---|
| 1,131,201 | 10/1956 | France. |
| 808,612 | 2/1959 | Great Britain. |
| 359,960 | 6/1938 | Italy. |
| 269,761 | 10/1950 | Switzerland. |

THERON E. CONDON, *Primary Examiner.*

EARLE J. DRUMMOND, GEORGE O. RALSTON, LOUIS G. MANCENE, *Examiners.*